United States Patent [19]
Hogan et al.

[11] 4,053,948
[45] Oct. 11, 1977

[54] LOOK ASIDE ARRAY INVALIDATION MECHANISM

[75] Inventors: Spurgeon Graves Hogan; Carleton Edward Werve, both of Poughkeepsie, N.Y.

[73] Assignee: IBM Corporation, Armonk, N.Y.

[21] Appl. No.: 697,817

[22] Filed: June 21, 1976

[51] Int. Cl.² .................... G06F 13/00; G11C 9/06
[52] U.S. Cl. .............................................. 364/200
[58] Field of Search .................... 340/172.5; 445/1; 235/153 AM

[56] References Cited
U.S. PATENT DOCUMENTS

| | | | |
|---|---|---|---|
| 3,781,808 | 12/1973 | Ahearn et al. | 340/172.5 |
| 3,839,706 | 10/1974 | Borchsenius | 340/172.5 |
| 3,938,100 | 2/1976 | Steiner | 340/172.5 |

*Primary Examiner*—Melvin B. Chapnick
*Attorney, Agent, or Firm*—James E. Murray

[57] ABSTRACT

A virtual memory system is described in which a set of conversion tables is used to translate an arbitrarily assigned programming designation called a virtual address into an actual main memory location called a real address. To avoid the necessity of translating the same address over and over again, a table called the Directory Look Aside Table (DLAT) retains current virtual to real address translations for use where particular virtual addresses are requested more than once. A counter is associated with the DLAT. Each time a translation is stored in the DLAT the present count in the counter is stored along side the translation. Each time the DLAT is invalidated the counter is stepped so that with each invalidation a new number is stored in the DLAT with the next translation. When a translation is read out of the DLAT the number stored with the translation is compared with the present number in the counter. If they do not match a No Compare signal is provided. If the match the translation in the DLAT is read out and fed into the directory.

3 Claims, 1 Drawing Figure

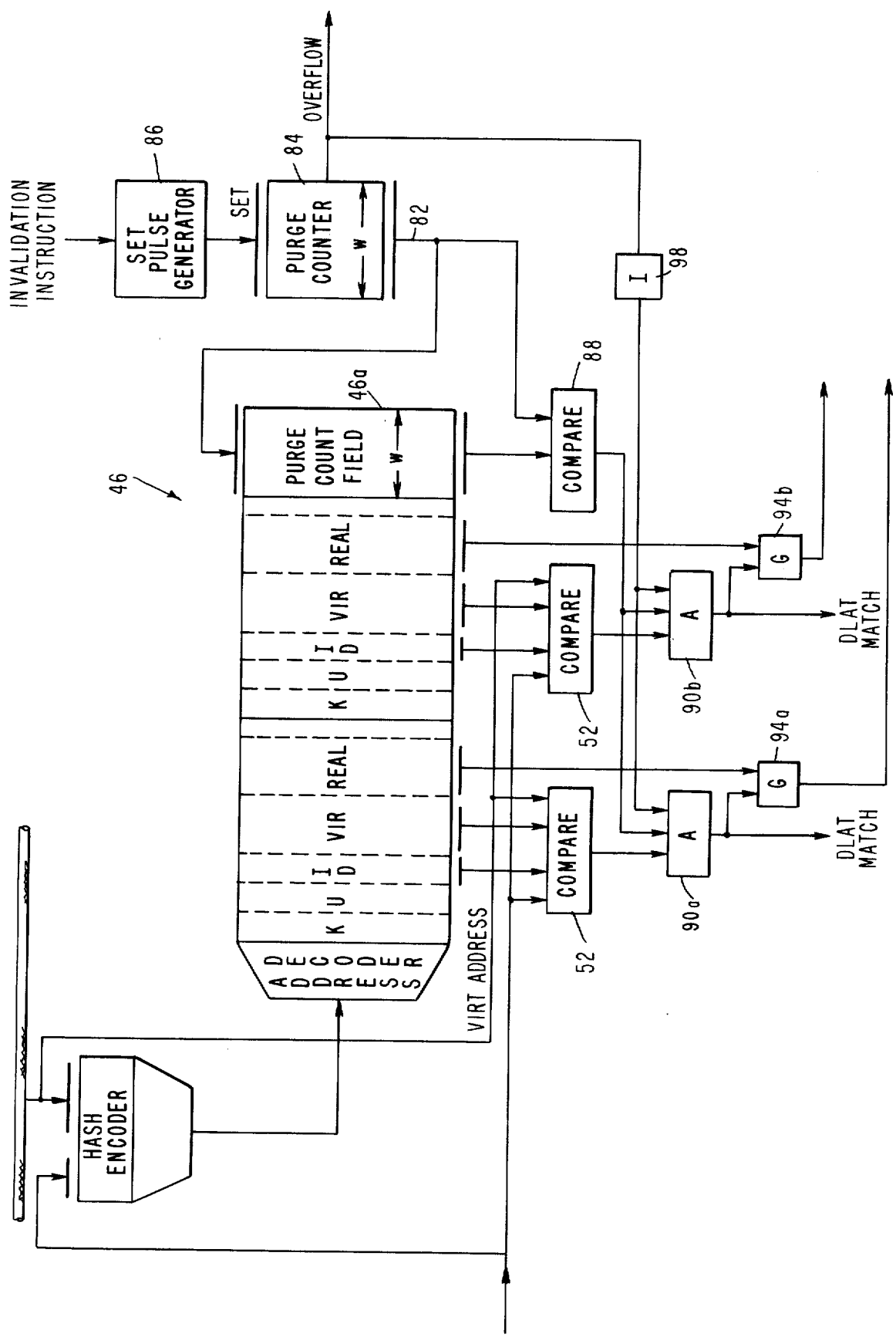

LOOK ASIDE ARRAY INVALIDATION MECHANISM

BACKGROUND OF THE INVENTION

This invention relates to computer storage systems and more particularly to computer storage systems including a virtual memory system for converting a virtual address to a real physical address.

Various techniques are known whereby several computer programs, executed either by a single central processing unit or by a plurality of processing units, share one memory. A memory being shared by programs in this manner requires an extremely large storage capacity, a capacity which is often larger than its actual capacity. To accommodate this situation the concept of "virtual storage" is employed. If, for example, a system employs a 24 bit addressing scheme $2^{24}$ bytes or approximately sixteen million addressable bytes of virtual storage are available. This virtual storage is divided into segments each of which is divided into pages, with each page consisting of a predetermined number of bytes. The segment and page addresses assigned to virtual storage are arbitrary programming designations and are not actual locations in main storage. Therefore, virtual segments and pages can be located randomly throughout main storage and swapped in and out of main storage as they are needed.

Random location of segments and pages in main storage necessitates the translation of virtual address into actual address using a set of conversion tables that are located in main storage. In a virtual memory system a number of sets of conversion tables are employed, each made up of a segment table and a number of page tables. Each page table in a set of conversion tables reflects the real locations of all the pages of one segment in the segment table. Therefore, if a particular segment table is divided into 16 segments, there would be 16 page tables and one segment table in the set of conversion tables in performing a translation.

In making a translation, the proper set of conversion tables is selected and the segment table in the set of conversion tables is used to find the location of the page tables in the real memory. The proper page table is then used to find the real location of the addressed page. The byte portion of a virtual address refers to a real location in memory so that once the segment and page portions of the virtual address have been translated to give a page location the byte portion is concatenated onto the page location to give the real address in main storage.

To avoid having to translate an address each time the memory is accessed, current translations of virtual addresses to real addresses are retained in another table called the Directory Look Aside Table (DLAT) where such addresses can be obtained with a virtual address without going through the described translation process. The use of the DLAT significantly reduces the number of translation that must be made and thus has a considerable effect on the performance of the virtual memory system.

Multiple sets of tables are used to generate the translations stored in the DLAT. One problem with this is that it could result in the selection of an incorrect translation from the DLAT. To assure that the conversion table used in deriving the real addresses stored in the DLAT are the same as those tables used in deriving the real addresses of the data currently being paged, it has been suggested in U.S. Pat. No 3,781,808 filed on Dec. 25, 1973 and assigned to the same assignee as the present invention that an identifier be stored in the DLAT along with each translation. In Ahearn et al U.S. Pat. No. 3,781,808 entitled "Virtual Memory System" this identifier is a 3 digit number that signifies the set of tables used in making the translation. In interrogating the DLAT this stored identifier is compared with an identifier generated for the currently requested virtual address. If the virtual address and identifiers of the currently requested address match those for a translation stored in the DLAT, the translation stored in the DLAT may be used. If the identifiers or virtual addresses do not match a new translation must be performed using the set of conversion tables associated with the currently requested address. This identifier can also be used to distinguish between virtual addresses having different page and segment sizes and, in addition, can be used to indicate that a real address is being employed instead of a virtual address.

Another case where an incorrect translation can be used is where for a number of reasons the entries in the DLAT are invalid. When this happens the DLAT must be purged by an invalidation or purge instruction. One solution to purging the DLAT is to have invalid bits stored with each translation in the DLAT invalidation. When a purge instruction occurs these bits are reset to indicate that the instruction is invalid. However this takes a significant length of time. Every time an invalid instruction is received by the memory all the entries have to be read out one at a time and written back into the DLAT in order to reset the valid bits. This is a very slow process.

BRIEF DESCRIPTION OF THE INVENTION

Therefore in accordance with the present invention a new technique of handling invalidation instructions is provided. This technique uses a counter and each time a new translation is entered into the DLAT the count of the counter is stored in the DLAT along with the translation. When there is an invalidation instruction to the DLAT the counter is stepped one number so that after the invalidation instruction a new number is stored with the translations. When a translation is read out of the DLAT the number stored with the translation is compared with the present count of the counter. If they do not match an indication is provided that there is no valid translation in the DLAT. If they match a DLAT compare signal is provided and the translation stored in the DLAT is used.

Therefore it is an object of the present invention to prevent errors from occurring in the translation from virtual addresses to real addresses.

Another object of the invention is to minimize the amount of time used in purging the DLAT on the occurrence of of invalidation instructions.

Another object of the invention is to prevent errors from occurring due to the use of an invalidated translation.

THE DRAWING

The foregoing and other objects and features of the present invention will be apparent from the following description of the preferred embodiment of the invention as illustrated in the accompanying drawing of a block diagram showing how the virtual memory system of the above identified patent can be configured to incorporate the present invention.

DETAILED DESCRIPTION

As shown the DLAT 46 contains recently translated virtual addresses along with the corresponding real addresses in the manner described in the above mentioned issued patent and can be considered identical to the structure to the DLAT 46 shown in FIGS. 6A and 6B of that patent with the exception that the DLAT 46 contains a number of additional bits W in a field 46a. The input to the W bit field 46a is the output 82 of a purge counter 84. The output 82 contains the same number of digits W as the field 46a in the DLAT 46 and is fed directly to the input of the field in the DLAT so that when the DLAT 46 is accessed for writing data into the DLAT by the hashed virtual address 86 supplied by the CPU, the count of the counter 84 is placed in the purge count field 46a along with the other data for the translation being entered. Thus each translation in the DLAT is accompanied by a W bit wide field of numbers from the counter 84.

The purge counter is initialized at zero count and the first translation entered in the DLAT would have this stored with it. Succeeding translations would also be stored with a zero count in the field until an invalidation instruction occurs. When an invalidation instruction occurs, the set pulse generator advances the count of the counter 84 by one. Each entry into the DLAT after the count is changed is accompanied by the number one until the count is changed again. This will continue until the counter overflows. Each invalidation instruction results in a change in number stored with the translations occurring after that invalidation instruction.

When a translation is read out of the DLAT 46 the output of the purge count field 46 is also read out. It is fed into a comparator 88 and compared with the present output of the purge counter 84. If they match a match signal is placed in AND gates 90a and 90b along with the outputs of comparators 52 which check the virtual position and identifiers of the translations stored in the DLAT 46 with the virtual address and identifier of the address accessing the memory. If a compare signal is present at the output of all of the comparators 52 a DLAT match signal is issued from one of the AND gates 90a or 90b. This DLAT match signal is fed into a gate 94a or 94b allowing the real address stored with the accessed translation to be used to access the buffer in the memory system of the previously mentioned patent. If the present count of the counter 84 does not match the number read out of the field 46a, there is no compare signal from the counter 88 so that neither AND gate 90a or 90b will produce a DLAT match signal and the real address stored with an accessed translation will not be passed through one of the gates 94a or 94b to be used to access the buffer in the memory system.

When the counter overflows, the overflow output is inverted in inverter 98 and fed to AND gates 90a and 90b to prevent the generation of a DLAT match signal irrespective of whether the count in the counter 86 matches the count in the purge field of the addressed translation. At that time the DLAT array must be purged in one of the prior art schemes such as setting the invalidation bit 100.

With this arrangement the valid bits in the DLAT have to be set only once for the total count of the counter 84 instead of each time a purge signal is received. For instance of the W bit field is 8 bits wide it means that the DLAT array 46 must be invalidated only once for each 256 invalid instructions instead of after every purge instruction.

While the invention has been particularly shown and described with reference to a preferred embodiment thereof, it will be understood by those skilled in the art that the above and other changes in form and details may be made therein without departing from the spirit and scope of the invention.

What is claimed is:

1. In a data processing system which contains a central processing unit, a main memory system with a main storage unit having a storage control unit and a plurality of addressable locations each addressable by a storage address, addressing means providing virtual addresses, and means for translating virtual addresses to real addresses including a plurality of sets of conversion tables, and improved translation control means comprising:

counter means for numbering purge instructions received by the memory system, table means for storing a plurality of previously used virtual addresses each with a real address which constitutes a translation of that virtual address using one of said sets of conversion tables, said table means having a field coupled to the output of the counter means for storing the count of the counter means with each translation so that each time a translation is entered into the table means the count of the counter means at the time of entry is placed in the table means along with the translation, comparator means for comparing the output of the counter means with the output of the field in the table means when a translation is read from the table means to provide a signal indicating a match or mismatch of the output of the counter means at the time the translation is read from the table means with the count stored with the translation, and, gate means controlling the transmission of the translation to the memory system as a function of said signal from the comparator means whereby invalidated translations cannot be used to address the memory system.

2. The data processing system of claim 1 wherein said counter means has overflow means coupled to said gate means to prevent a match signal if the counter means has overflowed.

3. The data processing system of claim 1 wherein said counter means includes means for stepping the counter means each time a purge instruction is received.

* * * * *